US011250401B2

(12) United States Patent
Inagawa

(10) Patent No.: US 11,250,401 B2
(45) Date of Patent: *Feb. 15, 2022

(54) COMMODITY SALES DATA PROCESSING APPARATUS AND METHOD FOR TAKING OVER PROCESSING BY THE SAME

(71) Applicant: TOSHIBA TEC KABUSHIKI KAISHA, Tokyo (JP)

(72) Inventor: Nobuhiro Inagawa, Mishima (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 420 days.

This patent is subject to a terminal disclaimer.

(21) Appl. No.: 16/451,066

(22) Filed: Jun. 25, 2019

(65) Prior Publication Data
US 2019/0311342 A1 Oct. 10, 2019

Related U.S. Application Data

(63) Continuation of application No. 15/254,057, filed on Sep. 1, 2016, now Pat. No. 10,346,820, which is a (Continued)

(30) Foreign Application Priority Data

Jul. 16, 2013 (JP) ................................. 2013-147856

(51) Int. Cl.
*G06Q 20/20* (2012.01)
*G06F 1/16* (2006.01)
(Continued)

(52) U.S. Cl.
CPC ........... *G06Q 20/20* (2013.01); *G06F 1/1632* (2013.01); *G06F 13/4081* (2013.01);
(Continued)

(58) Field of Classification Search
CPC .................................................. G06Q 20/201
See application file for complete search history.

(56) References Cited

U.S. PATENT DOCUMENTS 9,026,666 B2 5/2015 Krishnakumar et al.
9,171,328 B2 10/2015 Argue et al.
(Continued)

FOREIGN PATENT DOCUMENTS

JP 9-293171 11/1997

OTHER PUBLICATIONS

Japanese Office Action for Japanese Patent Application No. 2019-136253 dated Jul. 14, 2020.

*Primary Examiner* — Allen C Chein
(74) *Attorney, Agent, or Firm* — Amin, Turocy & Watson, LLP

(57) ABSTRACT

In accordance with one embodiment, a commodity sales data processing apparatus comprises a stationary type docking station with a storage module, and a portable information terminal which is attached to and detached from the docking station freely. The information terminal receives an input of data relating to the sales of a commodity to process the received data, and stores the data required to take over the processing in the storage module of the docking station Then the information terminal successively executes, if the information terminal is attached to the docking station, the processing by referring to the data stored in the storage module of the docking station.

6 Claims, 8 Drawing Sheets

Related U.S. Application Data continuation of application No. 14/331,452, filed on Jul. 15, 2014, now abandoned.

(51) Int. Cl.
  *G07G 1/00* (2006.01)
  *G06F 13/40* (2006.01)
  *G07G 1/12* (2006.01)

(52) U.S. Cl.
  CPC ......... *G07G 1/0018* (2013.01); *G07G 1/0081* (2013.01); *G07G 1/12* (2013.01); *G06Q 20/202* (2013.01); *G07G 1/0009* (2013.01); *G07G 1/0036* (2013.01)

(56) References Cited

U.S. PATENT DOCUMENTS

| | | | |
|---|---|---|---|
| 2003/0191698 A1* | 10/2003 | Brown | G07F 9/026 705/28 |
| 2012/0203605 A1* | 8/2012 | Morgan | G06Q 20/322 705/14.17 |
| 2014/0052554 A1 | 2/2014 | Abraham | |

\* cited by examiner

WORK HISTORY TABLE 42b

| DATE AND TIME | TERMINAL | WORK NAME | APPLICATION CODE | TAKEOVER CODE | TERMINAL BEFORE TAKEOVER |
|---|---|---|---|---|---|
| 2013.2.21 23:02:35 | X1 | SALES REGISTRATION | 1003 | — | — |
| 2013.2.22 01:12:30 | X3 | STOCK MANAGEMENT | 1002 | — | — |
| 2013.2.22 02:10:15 | X5 | CHECKOUT | 1001 | Y321 | — |

FIG.5

| WORK HISTORY TABLE ||||||
|---|---|---|---|---|---|
| DATE AND TIME | TERMINAL | WORK NAME | APPLICATION CODE | TAKEOVER CODE | TERMINAL BEFORE TAKEOVER |
| 2013.2.21 23:02:35 | X1 | SALES REGISTRATION | 1003 | — | — |
| 2013.2.22 01:12:30 | X3 | STOCK MANAGEMENT | 1002 | — | — |
| 2013.2.22 02:10:15 | X5 | CHECKOUT | 1001 | Y321 | — |
| 2013.2.22 02:10:32 | X4 | CHECKOUT | 1001 | Z123 | X5 |

COMMODITY SALES DATA PROCESSING APPARATUS AND METHOD FOR TAKING OVER PROCESSING BY THE SAME

CROSS-REFERENCE TO RELATED APPLICATIONS

This application is a Continuation of application Ser. No. 15/254,057 filed Sep. 1, 2016, which is a Continuation of application Ser. No. 14/331,452 filed Jul. 15, 2014, the entire contents of both of which are incorporated herein by reference.

This application is based upon and claims the benefit of priority from Japanese Patent Application No. 2013-147856, filed Jul. 16, 2013, the entire contents of which are incorporated herein by reference.

FIELD

Embodiments described herein relate to an information terminal, a commodity sales data processing apparatus including a portable information terminal and a method for taking over the processing by the commodity sales data processing apparatus.

BACKGROUND

There is known a commodity sales data processing apparatus, for example, a POS (Point Of Sales) terminal, which reads data of a commodity brought to a checkout counter by a customer and processes the read data as the commodity sales data.

The POS terminal is a stationary type terminal arranged at the checkout counter of a store.

In the meantime, recently, a portable information terminal, for example, a tablet type information terminal, which is capable of receiving information input through a touch operation on a display screen is popularized widely but the sales price thereof is greatly falling.

BRIEF DESCRIPTION OF THE DRAWINGS

FIG. 5 is a diagram illustrating the content of a work history table according to each embodiment;

DETAILED DESCRIPTION

In accordance with one embodiment, a commodity sales data processing apparatus comprises a stationary type docking station with a storage module, and a portable information terminal which is attached to and detached from the docking station freely. The information terminal receives an input of data relating to the sales of a commodity to process the received data, and stores the data required to take over the processing in the storage module of the docking station. Then the information terminal successively executes, if the information terminal is attached to the docking station, the processing by referring to the data stored in the storage module of the docking station.

A First Embodiment

A commodity sales data processing apparatus according to the first embodiment is described below with reference to the accompanying drawings. In the present embodiment, a commodity sales data processing apparatus is exemplified which uses a tablet type information terminal to realize functions as a POS terminal.

Figure 1:
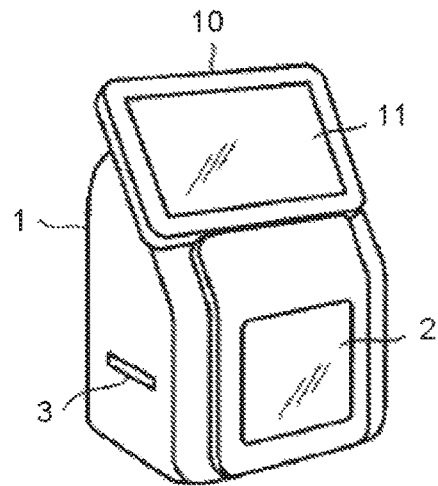
FIG. 1 is an external view illustrating a docking station and a tablet terminal according to each embodiment.
Figure 2:
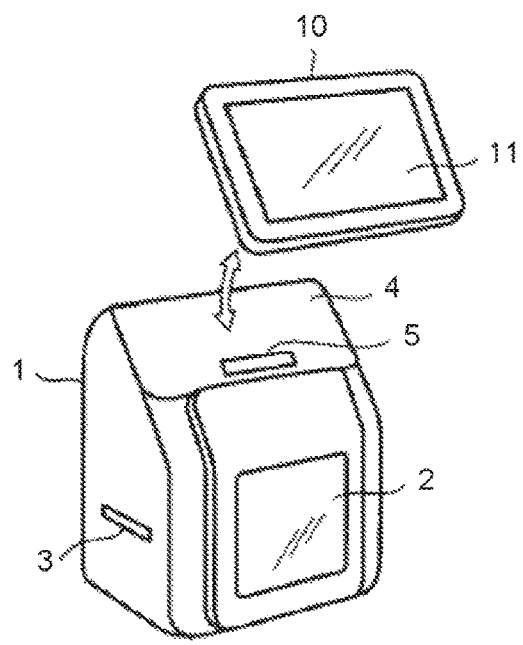
FIG. 2 is a diagram illustrating a state in which the tablet terminal is detached from the docking station according to each embodiment.

In FIG. 1, a stationary type docking station 1 is arranged on a checkout counter (not shown) in a store. An information terminal 10, which can be attached to and detached from the docking station 1, is a tablet type information terminal (hereinafter referred to as tablet terminal), for example. FIG. 1 shows a state in which the tablet terminal 10 is attached to the docking station 1 and FIG. 2 shows a state in which the tablet terminal 10 is detached from the docking station 1.

The docking station 1 includes a box-shaped housing on the upper portion of which the tablet terminal 10 is attached (placed), a reading window 2 of a scanner arranged at the front side of the housing and a receipt issue port 3 arranged at the left side of the housing. If the tablet terminal 10 is lifted from the docking station 1, an inclined terminal mounting portion 4 on the upper portion of the housing of the docking station 1 appears, and an extension connector 5 arranged on the terminal mounting portion 4 is exposed, as shown in FIG. 2.

The tablet terminal 10 includes a rectangular-shaped housing that can be held with one hand, a touch panel type display section 11 which is arranged on the upper surface of the housing and is capable of receiving a touch operation, and a docking connector 68 described later which is arranged at the back side of the housing. The tablet terminal 10 and the docking station 1 are electrically connected with each other such that the docking connector 68 is inserted into the extension connector 5 while the back side of the tablet terminal 10 is placed on the terminal mounting portion 4 of the docking station 1. Such an electrical connection can be released easily by lifting the tablet terminal 10 to separate the tablet terminal 10 from the terminal mounting portion 4.

Figure 3:
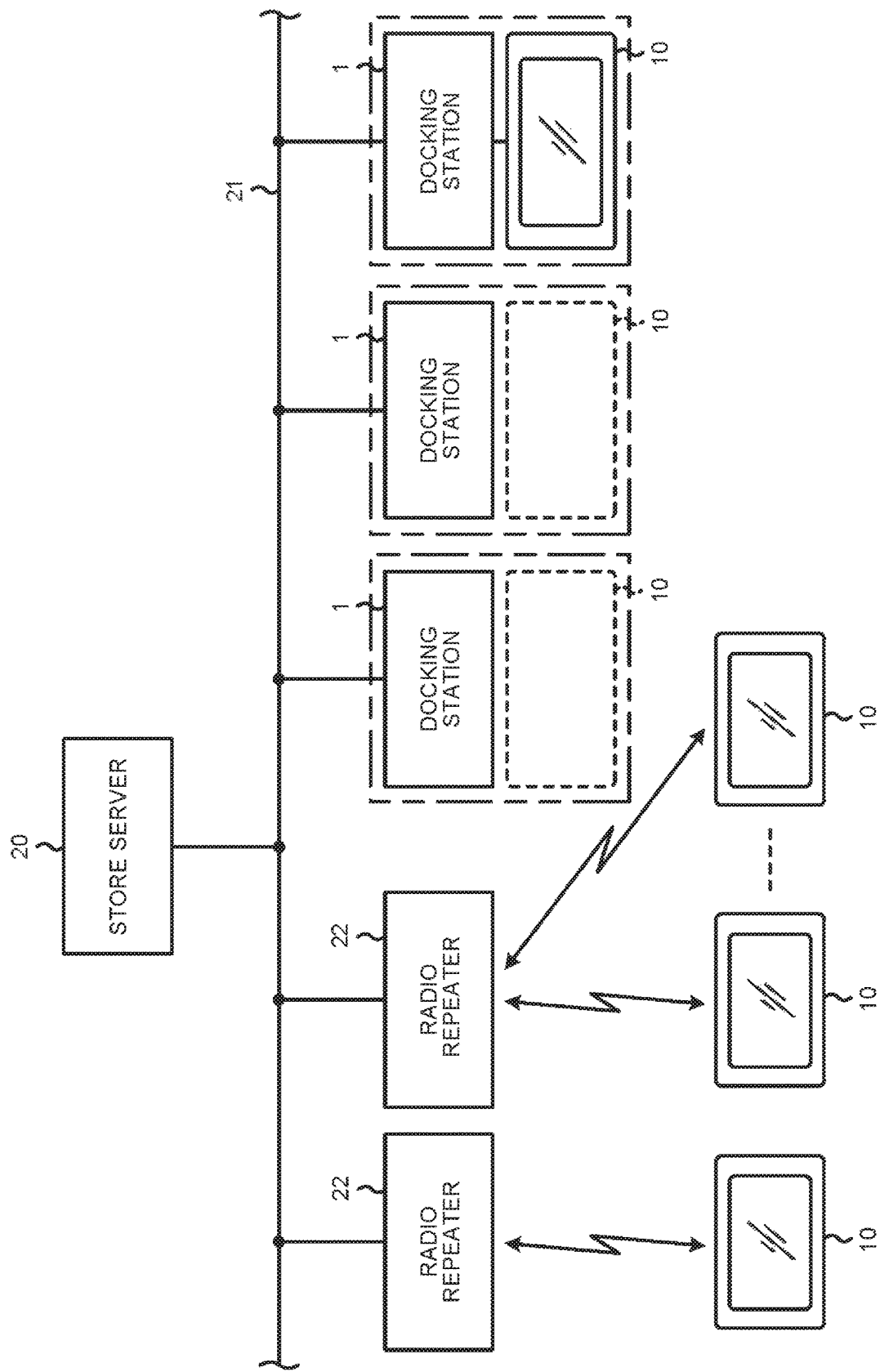
FIG. 3 is a schematic diagram illustrating the constitution of a POS system according to each embodiment.

One docking station 1 and one tablet terminal 10 constitute a commodity sales data processing apparatus. A POS system using such a commodity sales data processing apparatus is schematically illustrated in FIG. 3.

The POS system comprises a plurality of commodity sales data processing apparatuses and a store server 20 which centrally manages these commodity sales data processing apparatuses. The docking station 1 of each commodity sales data processing apparatus and the store server 20 are connected with each other to be capable of carrying out bidirectional communication through a network 21 such as a LAN (Local Area Network). Further, the tablet terminal 10 of each commodity sales data processing apparatus and the store server 20 are connected with each other to be capable of carrying out bidirectional communication through the network 21 and one or a plurality of radio repeaters 22 connected with the network 21. The tablet terminal 10 can realize function of the POS terminal both when being attached to the docking station 1 and when being detached from the docking station 1.

To carry out the operation of a store, each of a plurality of shop clerks holds each tablet terminal 10. When taking the work of a cashier at the checkout counter, the shop clerk attaches his or her tablet terminal 10 to the docking station 1 on the checkout counter and carries out checkout processing similar to that of a general POS terminal according to the display of the touch panel type display section 11 of the tablet terminal 10.

Figure 4:
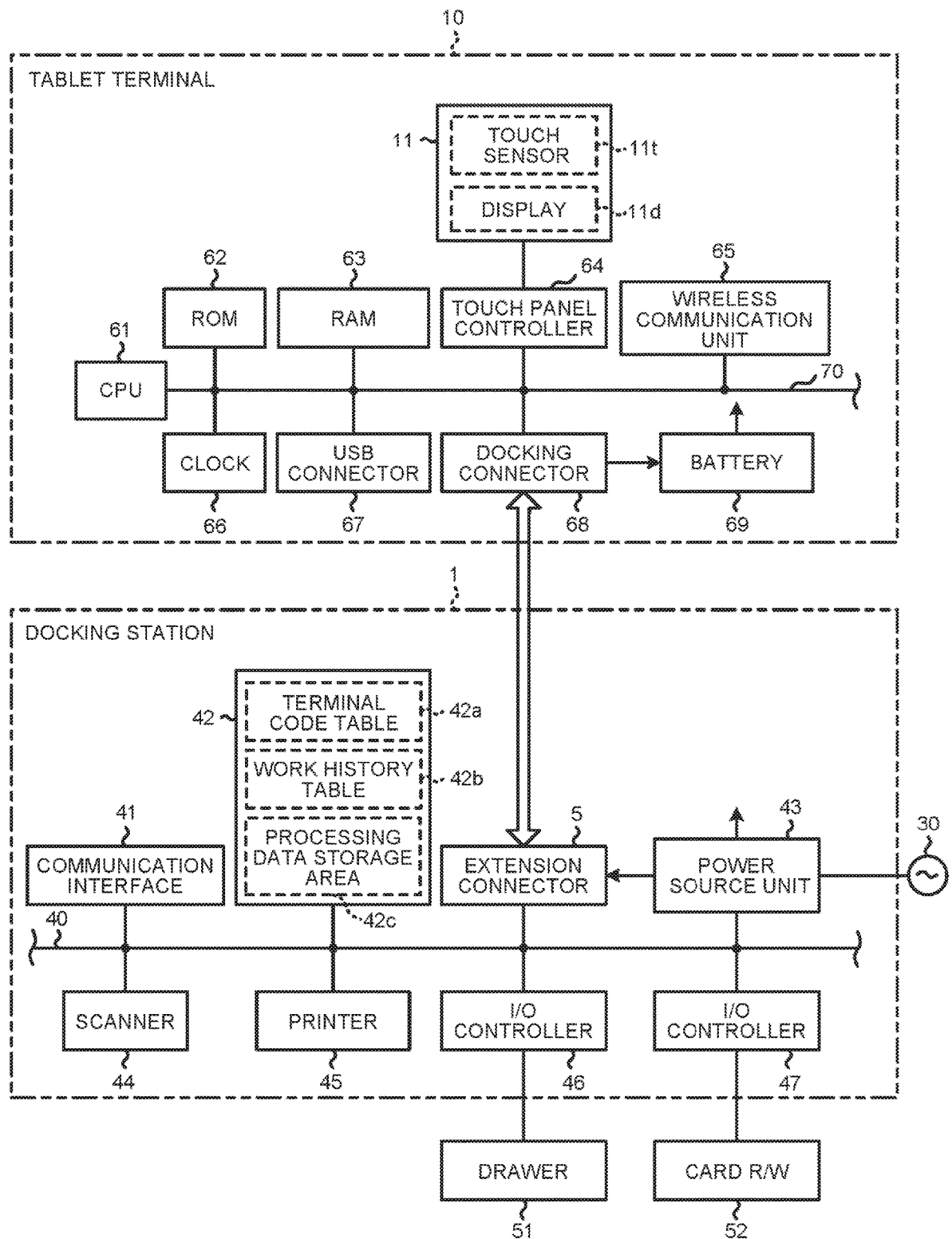
FIG. 4 is a block diagram illustrating the main portions of the docking station and the tablet terminal according to each embodiment.

FIG. 4 shows main portions of the docking station 1 and the tablet terminal 10.

In addition to the extension connector 5 mentioned above, the docking station 1 further includes a communication interface 41, an auxiliary storage device (storage module) 42, a power source unit 43, a scanner 44, a printer 45 and I/O controllers 46 and 47. The communication interface 41, the auxiliary storage device 42, the power source unit 43, the scanner 44, the printer 45 and the I/O controllers 46 and 47 are connected with each other through a bus line 40 including an address bus line, a data bus line and the like.

The communication interface 41 is connected with the network 21. The communication interface 41 manages data transmission/reception between the tablet terminal 10 and the store server 20 through the network 21.

The auxiliary storage device 42 is an auxiliary storage part of a computer. The auxiliary storage device 42 is, for example, an EEPROM (electric erasable programmable read-only memory), an HDD (Hard Disk Drive), or a SSD (solid state drive) and the like. The auxiliary storage device 42 stores data used when a CPU 61 of the tablet terminal 10 carries out various processing and data generated in the processing carried out by the CPU 61. As occasion demands, the auxiliary storage device 42 also stores an application program.

The auxiliary storage device 42 stores a terminal code table 42a and a work history table 42b, and includes a processing data storage area 42c.

The terminal code table 42a, in which each tablet terminal 10 is associated with the shop clerk code of a shop clerk carrying the tablet terminal 10, is sent from the store server 20 to each docking station 1 to be updated regularly.

As show in FIG. 5, the work history table 42b, which is used to store the data required to take over the processing of the tablet terminal 10 as a history, contains items such as a date, terminal, work name, application code, takeover code, terminal-before-takeover and the like.

Data of the date when the processing is started is set in the date item. A terminal code such as "X1" "X2" . . . "Xn" of the tablet terminal 10 executing the processing is set in the terminal item. A work name indicating what kind of work the processing executed by the tablet terminal 10 corresponds to is set in the work name item. A code for identifying the application program for executing the processing is set in the application code item. A takeover code for identifying which data in the processing data storage area 42c is the data required to take over the processing is set in the takeover code item. In a case in which the processing executed by the current tablet terminal 10 is a takeover to the processing by a former tablet terminal 10 attached before the current tablet terminal 10 is attached to the docking station 1, the terminal code (terminal-code-before-takeover) for indicating the tablet terminal 10 attached before takeover is set in the item of terminal-before-takeover.

The processing data storage area 42c stores the processed data which is actually processed within the data required to take over the processing.

The power source unit 43 converts the voltage of a commercial-use AC power source 30 into the operation voltage of the docking station 1 to output the converted voltage, and outputs charging voltage to the tablet terminal 10. The charging voltage is supplied for the tablet terminal 10 through the extension connector 5.

The scanner 44 optically reads a barcode and the like held to the reading window 2. The scanner 44 may also be a scanner which reads a barcode and the like attached to a commodity from a commodity image captured by a camera.

The printer 45 carries out printing on a continuous sheet supplied from a rolled paper in a thermal system, for example. The printed sheet is discharged from the receipt issue port 3 and cut to issue it as a receipt. The printer 45 can use a label sheet as the rolled paper to issue a label. Further, the printer 45 may also be a printer other than the thermal type printer.

The I/O controller 46 controls an equipment, for example, a drawer 51 externally arranged on the rear or side surface of the housing of the docking station 1. The I/O controller 47 controls a machine, for example, a card reader/writer 52 externally arranged on the rear or side surface of the housing of the docking station 1. The card reader/writer 52 is capable of carrying out a data read/write processing on an electronic money card.

On the other hand, the tablet terminal 10 comprises a CPU (Central Processing Unit) 61, a ROM (Read Only Memory) 62, a RAM (Random Access Memory) 63, a touch panel controller 64, a wireless communication unit 65, a clock 66, a USB (Universal Serial Bus) connector 67, a docking connector 68, a battery 69 and the like. The CPU 61 is connected with the ROM 62, the RAM 63, the touch panel controller 64, the wireless communication unit 65, the clock 66, the USB connector 67 and the docking connector 68 through a bus line 70 including an address bus, a data bus and the like.

The CPU 61 is a central part of a computer. The CPU 61 controls each section to realize various functions of the POS terminal according to an operating system or an application program.

The ROM 62 is a main storage part of the computer. The ROM 62 stores the operating system and the application program mentioned above. As occasion demands, the ROM 62 also stores data required to execute various processing by the CPU 61.

The RAM 63 is also a main storage part of the computer mentioned above. The RAM 63 stores data required to execute various processing by the CPU 61 as needed. Further, the RAM 63 is also used as a work area for the CPU 61 when various processing is executed.

The touch panel type display section 11 is constituted by arranging a touch sensor 11t serving as an input section at the display part of a display 11d. The touch panel controller 64 connected with the touch panel type display section 11 controls the screen of the display 11d and monitors a signal of the touch sensor 11t. The touch panel controller 64 detects input data according to the coordinate information of the touched position and the screen information of the display 11*d* at the time of the touch operation.

The wireless communication unit 65 performs data transmission/reception with the radio repeater 22 through a wireless communication. The clock 66 keeps the current date and time.

The USB connector 67 is used to connect various USB devices having a communication system based on a USB standard in a detachable manner. The drawer 51 and the card reader/writer 52 mentioned above can be connected with the USB connector 67.

The docking connector 68, which is used to connect the tablet terminal 10 with the docking station 1, is arranged at the back side of the housing of the tablet terminal 10.

The battery 69, which is used to output operation voltage of the tablet terminal 10, is automatically charged with the charging voltage supplied from the docking station 1 through the extension connector 5 and the docking connector 68 in a case in which the tablet terminal 10 is attached to the docking station 1.

The CPU 61 includes the following modules (1)-(6) as main functions according to the control program in the ROM 62:

(1) an input module which receives the touch operation and the like on the display screen of the touch panel type display section 11 and the read data of the scanner 44 in the docking station 1 as the input of data relating to the sales of the commodity;

(2) a processing module which processes the input data received by the input module as the commodity sales data;

(3) a first control module which stores the data required to take over the processing of the processing module in the auxiliary storage device 42 of the docking station 1, more specifically, the first control module sequentially storing the data required to take over the processing in the auxiliary storage device 42 of the docking station 1 as the processing module is executing the processing;

(4) a determination module which determines whether or not the tablet terminal 10 is attached to the docking station 1, more specifically, the determination module which sends a confirmation signal through the docking connector 68 to determine that the tablet terminal 10 is attached to the docking station 1 if the confirmation signal returns to the docking connector 68 or to determine that the tablet terminal 10 is not attached to the docking station 1 if the confirmation signal does not return to the docking connector 68;

(5) a second control module which enables, if the determination module determines that the tablet terminal 10 is attached to the docking station 1 (attaching timing), the processing module to successively execute the processing by referring to the data stored in the auxiliary storage device 42 of the docking station 1 to which the tablet terminal 10 is attached; and (6) a display control module which displays, in a case of continuously executing the processing, the data indicating the information terminal which was executing the processing on the touch panel type display section 11.

Figure 6:
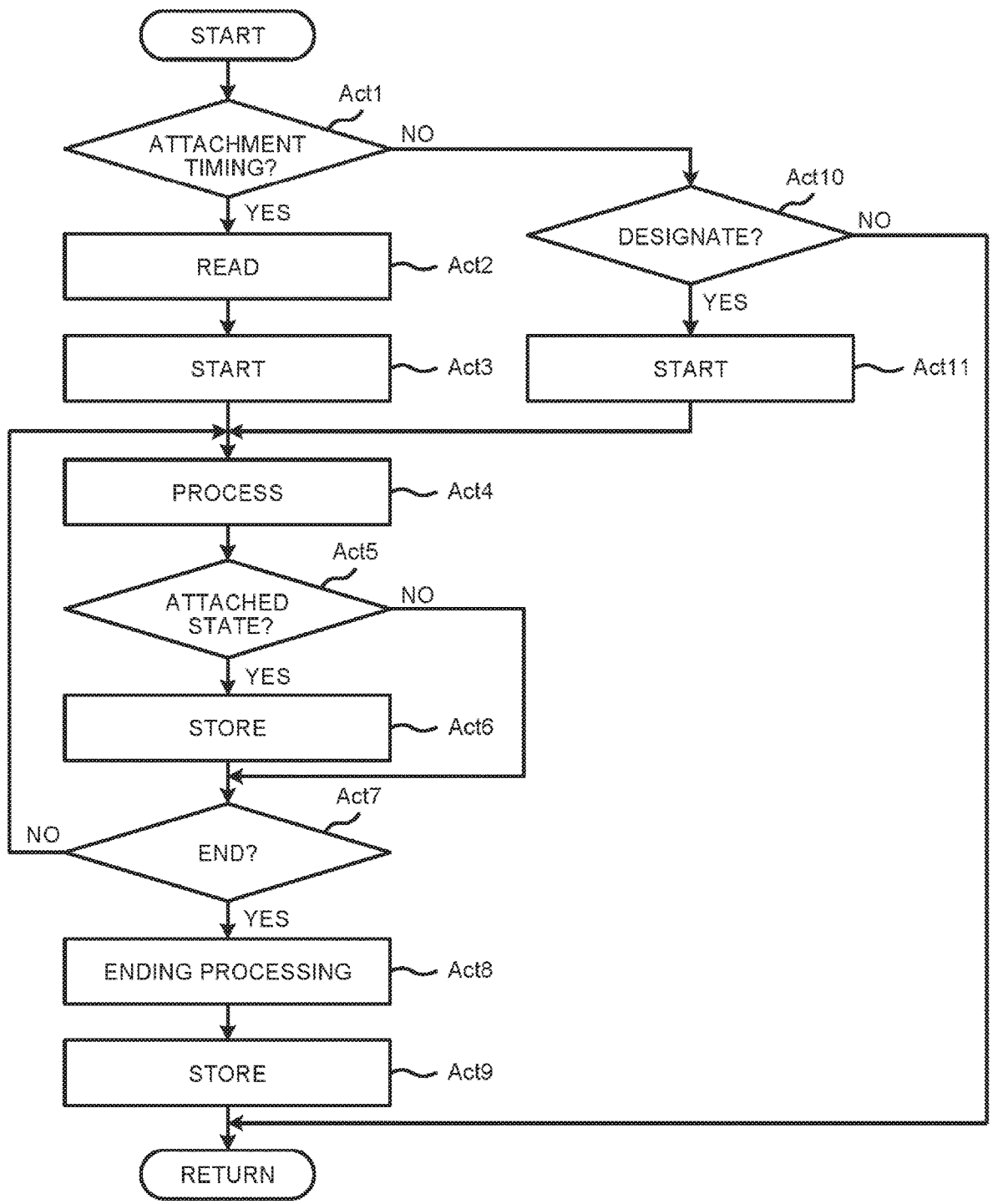
FIG. 6 is a flowchart illustrating the control operation executed by the CPU of a tablet terminal according to a first embodiment.

Next, the control operation executed by the CPU 61 of the tablet terminal 10 is described with reference to the flowchart shown in FIG. 6.

The shop clerk carrying out the checkout work at the checkout counter attaches his or her tablet terminal 10 to the docking station 1 on the checkout counter. Upon attaching the tablet terminal 10 to the docking station 1 (YES in ACT 1), the CPU 61 reads the data required to take over the processing from the former tablet terminal 10 attached earlier than the current tablet terminal 10 from the work history table 42*b* in the auxiliary storage device 42 of the docking station 1 (ACT 2). Then the CPU 61 starts the application program corresponding to the application code contained in the read data (ACT 3), and executes the processing according to the application program (ACT 4).

For example, in a case in which the former tablet terminal 10 attached earlier than the current tablet terminal 10 was executing a processing of checkout work, as shown in FIG. 5, the processing start date and time "2013.2.22 02:10:15", the terminal code "X5" of the tablet terminal 10 executing the processing, the work name "checkout", the application code "1001", the takeover code "Y321" and the terminal attached before the takeover "— (none)" are set in the last line of the work history table 42*b* as the history of the processing executed immediately before the takeover.

In this case, the CPU 61 starts the application program for checkout operation corresponding to the application code "1001", and acquires the processed data associated with the takeover code "Y321" from the processing data storage area 42*c* to continuously use the processed data in the following processing (checkout processing).

In the checkout operation, the shop clerk holds the barcode of the commodity brought to the checkout counter by a customer to the reading window 2 of the docking station 1 to register the commodity by reading the barcode on the commodity through the reading window 2.

Figures 7, 8:
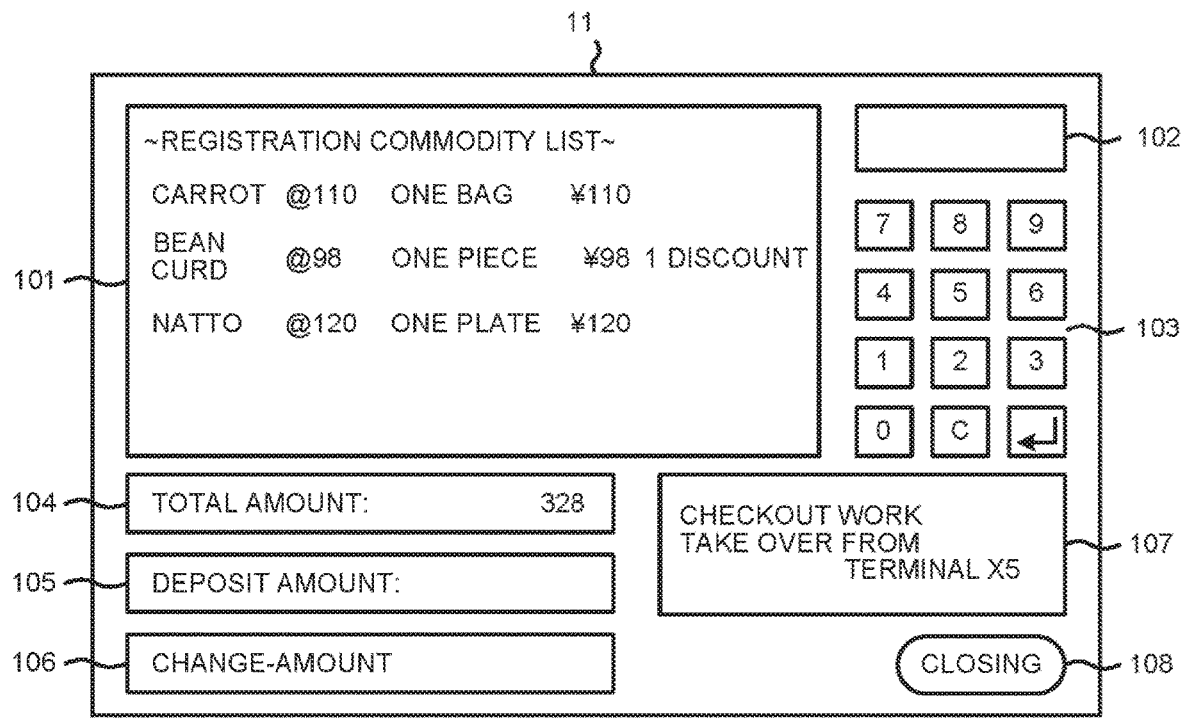
FIG. 7 is a diagram illustrating a checkout screen of the tablet terminal according to the first embodiment.
FIG. 8 is a diagram illustrating the transition of the content of the work history table in each embodiment.

During the process of the checkout operation, the CPU 61 displays the checkout screen shown in FIG. 7 on the touch panel type display section 11. Then the CPU 61 receives the touch operation on the checkout screen and the data read by the scanner 44 in the docking station 1 as the input of data relating to the sales of the commodity, and processes the received input data as the commodity sales data.

The checkout screen includes displays such as a commodity information display column 101, a numeric display column 102, a numeric key 103, a total amount display column 104, a deposit amount display column 105, a change-amount display column 106, a guidance display column 107, a closing key 108 and the like.

The commodity information display column 101 displays the registered commodity, quantity, subtotal, related information and the like. The numeric display column 102 displays the numeral input through the touch operation of the numeric key 103. The total amount display column 104 displays the total amount of the registered commodities. The deposit amount display column 105 displays the numeral input through the touch operation of the numeric key 103 as the deposit amount from the customer. The change-amount display column 106 displays the amount obtained by subtracting the total amount from the deposit amount as the change amount. The guidance display column 107 displays various guidance or instruction information for the shop clerk.

The current processing is the checkout processing taken over from the tablet terminal 10 with a terminal code "X5". Thus, as shown in FIG. 7, the CPU 61 displays the guidance information of "checkout work" and "take over from terminal X5" in the guidance display column 107.

If the tablet terminal 10 is in a state of being attached to the docking station 1 (YES in ACT 5), the CPU 61 frequently stores the data required to take over the processing in the auxiliary storage device 42 of the docking station 1 as execution of the processing in ACT 4 proceeds (ACT 6).

If the closing key 108 on the checkout screen is touched (ending operation) (YES in ACT 7), the CPU 61 executes a closing processing (ending processing) of calculating the checkout amount (total amount) based on the registration content (ACT 8).

In the closing processing, the CPU 61 displays the calculated checkout amount (total amount) in the total amount display column 104, the deposit amount in the deposit amount display column 105 and the change amount in the change amount display column 106. In the closing processing, the CPU 61 prints the commodity sales data on the receipt with the printer 45 and then discharges the receipt from the receipt issue port 3.

The CPU 61 also stores the content of the closing processing in the auxiliary storage device 42 of the docking station 1 as the "data required for takeover" (ACT 9). Through the storage processing, as shown in FIG. 8, the current processing start date and time "2013.2.22 02:10:32", the terminal code "X4" of the tablet terminal 10 executing the processing, the work name "checkout", the application code "1001", the takeover code "Z123" and the terminal attached before takeover "X5" are set in the last line of the work history table 42*b*.

In this way, the processing of the former tablet terminal 10 can be automatically taken over and executed only by attaching the tablet terminal 10 to the docking station 1. Thus, for example, in a case in which a shop clerk B takes over the checkout work from the shop clerk A, the shop clerk B coming later can start the checkout work quickly only by attaching his or her tablet terminal 10 to the docking station 1. The commodity sales form and the working system of shop clerk as well can be diversified. The waiting time of the customer can be minimized and thus the customer service can be improved as well.

It is easily imagined that the tablet terminal 10 being used stops operating due to a failure or abnormality while the shop clerk carries out the checkout work. In this case, the shop clerk can continue the checkout work without any hindrance only by attaching a spare tablet terminal 10 to the docking station 1 instead of the tablet terminal 10 that is no longer working.

Although the takeover of the processing of checkout work is described above, it is capable of executing processing other than the checkout work with the tablet terminal 10.

The CPU 61 monitors not the attaching the tablet terminal 10 to the docking station 1 (NO in ACT 1) but the designation of work on an initial screen (ACT 10). If the work is designated (YES in ACT 10), the CPU 61 starts the application program corresponding to the designated work (ACT 11), and executes the processing according to the application program (ACT 4). The following processing is the same as that described above, and is therefore not described repeatedly.

A Second Embodiment

The CPU 61 has following first control module (13) and second control module (15), instead of the first control module (3) and the second control module (5) described in the first embodiment within the main functions according to the control program in the ROM 62:

(13) a first control module which temporarily stops, when receiving a "processing takeover designation" based on the touch operation of a takeover key 109 described later, the processing being executed by the processing module, and stores the data required to take over the processing, more specifically, the "data required to restart and continue the stopped processing" in the auxiliary storage device 42 of the docking station 1; and

(15) a second control module which enables, if the determination module determines that the tablet terminal 10 is attached to the docking station 1 (attachment timing) and if a takeover code exists in the last line of the work history table in the auxiliary storage device 42, the processing module (2) described above to continuously execute the processing corresponding to the data stored in the auxiliary storage device 42 of the docking station 1 to which the tablet terminal 10 is attached.

Figure 9:
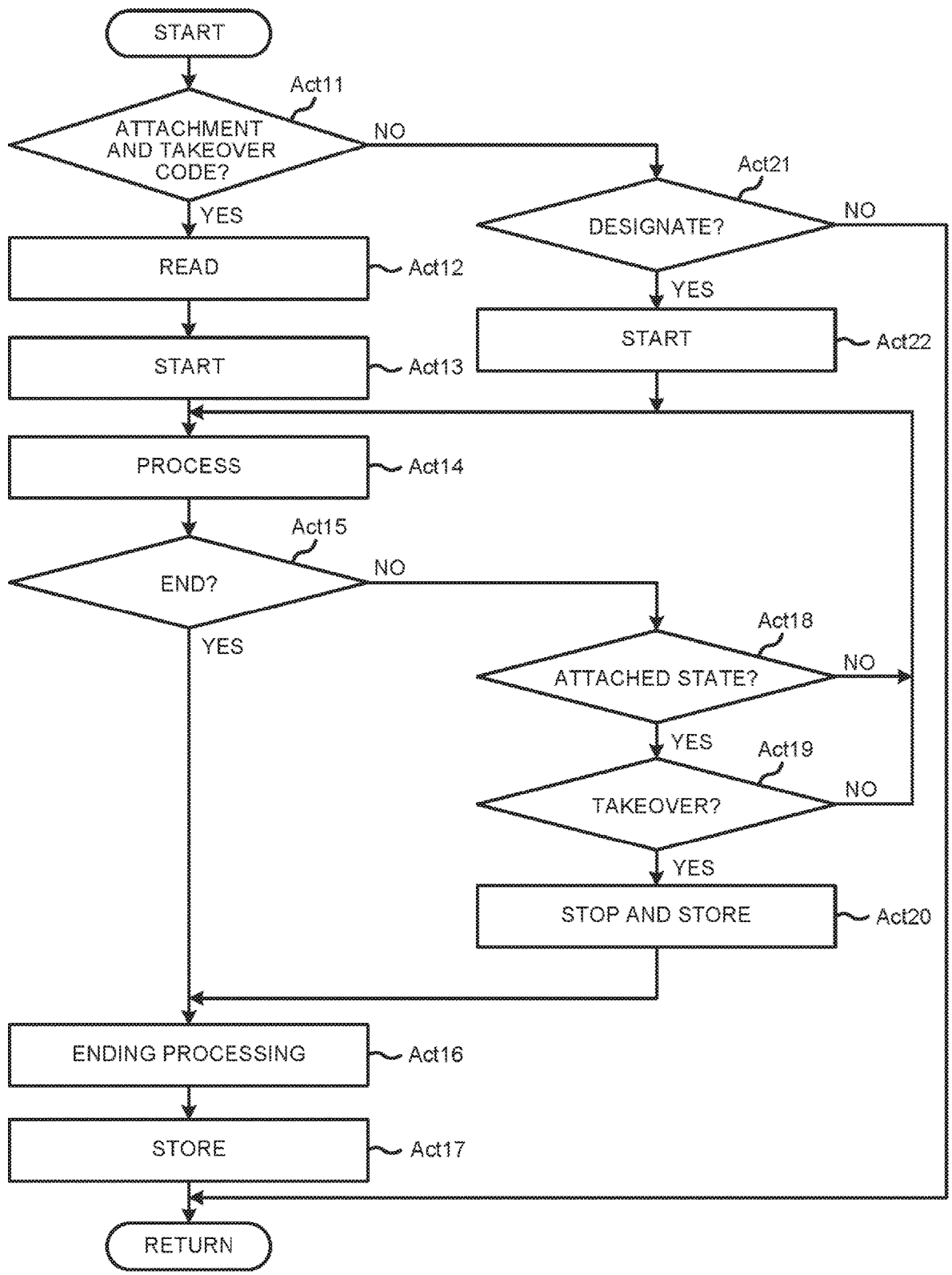
FIG. 9 is a flowchart illustrating the control operation executed by the CPU of a tablet terminal according to a second embodiment.

The control operation executed by the CPU 61 of the tablet terminal 10 is described below with reference to the flowchart shown in FIG. 9.

The shop clerk carrying out the checkout work at the checkout counter attaches his or her tablet terminal 10 to the docking station 1 on the checkout counter.

The CPU 61 monitors the attachment of the tablet terminal 10 to the docking station 1 and determines whether or not there is a takeover code at the timing of attaching the tablet terminal 10 to the docking station 1 (ACT 11). The existence of the takeover code is determined with reference to the work history table 42*b* in the auxiliary storage device 42 of the docking station 1 to which the tablet terminal 10 is attached.

If there is a takeover code in the last line of the work history table 42*b* (YES in ACT 11), the CPU 61 reads the "data required to restart and continue the stopped processing" containing the takeover code from the auxiliary storage device 42 (ACT 12). Then the CPU 61 starts the application program corresponding to the application code contained in the read data (ACT 13), and takes over the processing stopped by the former tablet terminal to successively execute it from the stop position according to the application program (ACT 14).

For example, in a case in which the former tablet terminal 10 attached before the current tablet terminal 10 is attached to the docking station 1 was executing a processing of checkout work, in the last line of the work history table 42*b* shown in FIG. 5, the processing start date and time "2013.2.22 02:10:15", the terminal code "X5" of the tablet terminal 10 executing the processing, the work name "checkout", the application code "1001", the takeover code "Y321" and the terminal-before-takeover "— (none)" are set as the history of the former processing just before that.

In this case, the CPU 61 starts the application program for checkout work corresponding to the application code "1001", and acquires the processed data associated with the takeover code "Y321" from the processing data storage area 42*c* to continuously use the processed data in the following processing.

In the checkout work, the shop clerk holds the barcode of the commodity brought to the register counter by a customer to the reading window 2 of the docking station 1 to read the barcode and registers the commodity.

Figure 10:
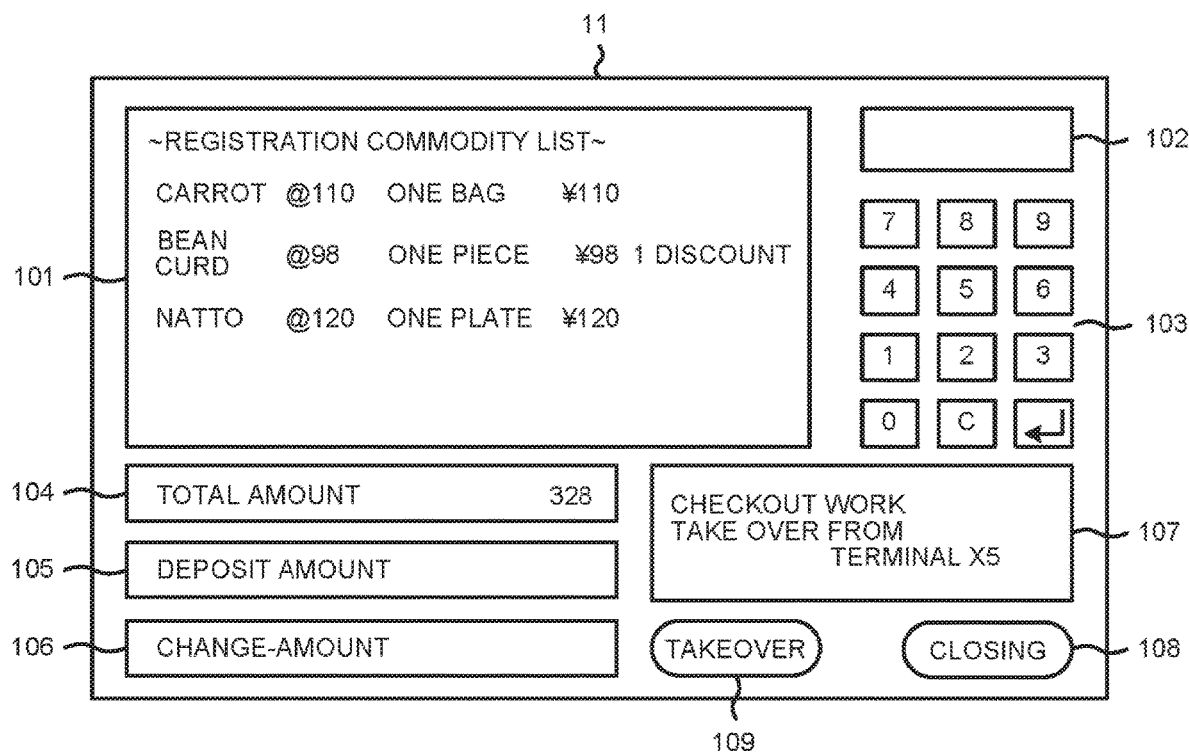
FIG. 10 is a diagram illustrating a checkout screen of the tablet terminal according to the second embodiment.

During the process of the checkout work, the CPU 61 displays the checkout screen shown in FIG. 10 on the touch panel type display section 11. Then the CPU 61 receives the touch operation on the checkout screen and the read data of the scanner 44 in the docking station 1 as the input of data relating to the commodity sales, and processes the received input data as the commodity sales data.

In addition to the commodity information display column 101, the numeric display column 102, the numeric key 103, the total amount display column 104, the deposit amount display column 105, the change amount display column 106, the guidance display column 107 and the closing key 108, the checkout screen shown in FIG. 10 further includes the display of a takeover key 109 serving as a takeover designation module. In the guidance display column 107, for example, the guidance of "checkout work" and "take over from terminal X5" are displayed.

If the closing key 108 on the checkout screen is touched (ending operation) (YES in ACT 15), the CPU 61 executes a closing processing (ending processing) of calculating the checkout amount (total amount) based on the registration content (ACT 16).

In the closing processing, the CPU 61 displays the calculated checkout amount (total amount) in the total amount display column 104, the deposit amount in the deposit amount display column 105 and the change amount in the change amount display column 106. In the closing processing, the CPU 61 prints the commodity sales data on the receipt with the printer 45 and then discharges the receipt from the receipt issue port 3.

The CPU 61 stores the data required to take over the processing in the auxiliary storage device 42 of the docking station 1 as the closing processing is being executed (ACT 17). Through the storage processing, as shown in FIG. 8, the current processing start date and time "2013.2.22 02:10:32", the terminal code "X4" of the tablet terminal 10 executing the processing, the work name "checkout", the application code "1001", the takeover code "Z123" and the terminal-before-takeover "X5" are set in the last line of the work history table 42b.

On the other hand, during the execution of the processing, if the closing key 108 is not touched (no ending operation) (NO in ACT 15) and the tablet terminal 10 is attached to the docking station 1 (YES in ACT 18), the CPU 61 monitors the touch operation of the takeover key 109 (ACT 19).

If there is an instruction "processing takeover designation" with the touch operation of the takeover key 109 (YES in ACT 19), the CPU 61 stops the processing being executed and stores the data required to restart the stopped processing and to continue it in the auxiliary storage device 42 of the docking station 1 (ACT 20).

Figure 11:
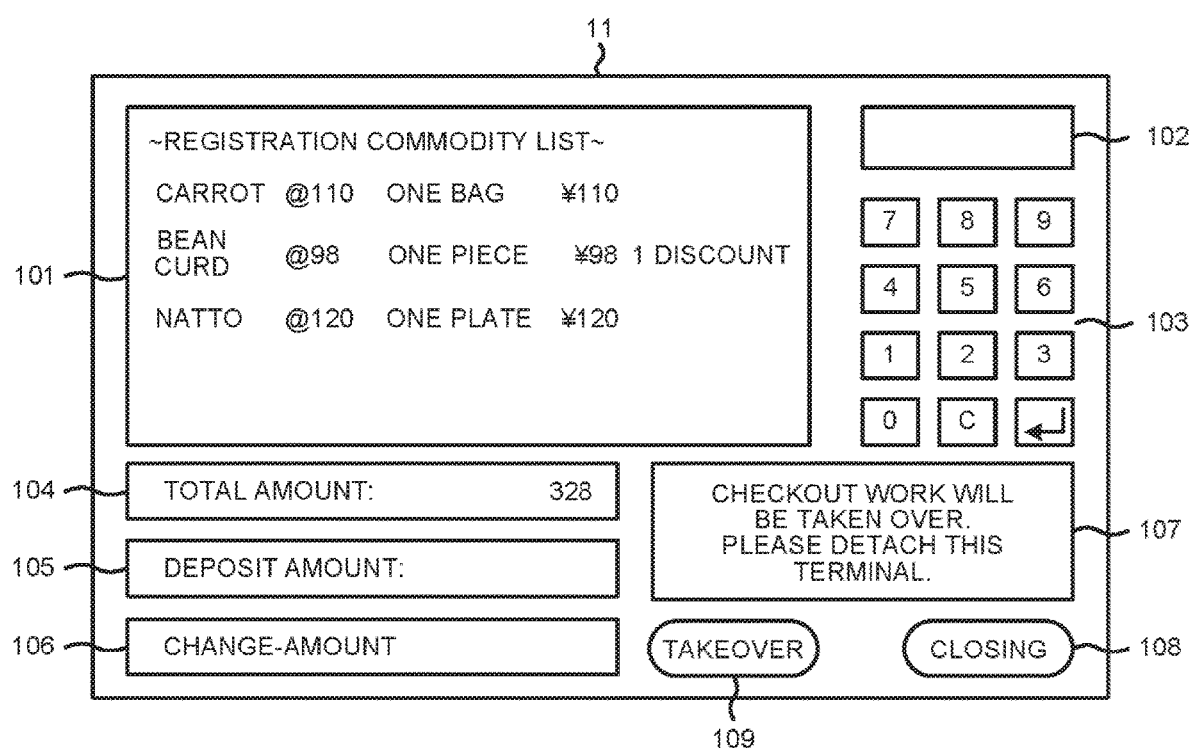
FIG. 11 is a diagram illustrating the checkout screen of the tablet terminal and a guidance for taking over displayed on the checkout screen according to the second embodiment.

In this case, as shown in FIG. 11, the CPU 61 displays guidance or instruction of "checkout work will be taken over. Please detach this terminal." in the guidance display column 107 of the checkout screen. The shop clerk who looks at the guidance detaches the tablet terminal 10 from the docking station 1 and shifts the work to other shop clerk or goes away for other work.

With the processing is stopped, the CPU 61 executes the ending processing for ending the series of processing (ACT 16), and stores the data relating to the ending processing in the auxiliary storage device 42 of the docking station 1 as the "data required to restart the stopped processing" (ACT 17). Through the storage processing, as shown in FIG. 8, the current processing start date and time "2013.2.22 02:10:32", the terminal code "X4" of the tablet terminal 10 executing the processing, the work name "checkout", the application code "1001", the takeover code "Z123" and the terminal-before-takeover "X5" are set in the last line of the work history table 42b.

In this way, the current processing can be stopped and taken over by other tablet terminal 10 only by touching the takeover key 109 on the screen. Thus, in a case in which the shop clerk at the checkout counter has to leave the checkout counter for some urgent things to do, the current checkout work can be taken over by other shop clerk without any inconvenience. The shop clerk taking over the checkout work can continue the checkout work quickly only by attaching his or her tablet terminal 10 to the docking station 1. As for the store, the commodity sales form and the working system of the shop clerk as well can be diversified. The waiting time of the customer can be minimalized and the customer service can be improved as well.

In addition, although the takeover of the processing of checkout work is described above, the tablet terminal 10 can also be used to execute the processing of other work.

Except the timing of attaching the tablet terminal 10 to the docking station 1 (NO in ACT 11), the CPU 61 monitors the designation of work on an initial screen (ACT 21). If the work is designated (YES in ACT 21), the CPU 61 starts the application program corresponding to the designated work (ACT 22), and executes the processing according to the application program (ACT 14). The following processing is the same as that described above, and is therefore not described repeatedly.

(A Modification)

The transfer of the commodity sales data processing apparatus is generally carried out in a state in which the programs such as control programs are stored in the ROM. However, the preset invention is not limited to this. The control program and the like transferred separately from a computer device may be written in a writable storage device of the computer device through an operation of a user and the like. The transfer of the control program and the like may be carried out by recording the program in a removable recording medium, or through a communication via a network. The form of the recording medium is not limited as long as the recording medium can store programs like a CD-ROM, a memory card and the like, and is readable by an apparatus. Further, the function realized by an installed or downloaded program can also be realized through the cooperation with an OS (Operating System) and the like installed in the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity sales data processing apparatus, comprising:
a stationary type docking station having a storage module; and
a portable information terminal configured to be attached to and detached from the docking station freely,
wherein the docking station includes a work history table in which at least an application code for identifying an application program executed by the portable information terminal and a takeover code for identifying data required to take over processing based on the application program are writable, and
the portable information terminal includes:
a processor configured to, when the information terminal is attached to the docking station, read the application code and the takeover code from the work history table of the docking station, start the application program identified by the application code, and successively execute processing based on the application program by continuously using the data identified by the takeover code in a following processing.

2. The commodity sales data processing apparatus according to claim 1, wherein the work history table further stores a terminal code for identifying the information terminal that has executed the processing based on the application program.

3. The commodity sales data processing apparatus according to claim 1, wherein the processor is configured to, when the information terminal is attached to the docking station, read the application code, the takeover code, and the terminal code from the work history table of the docking station, and shows on a display that the processing based on the application program identified by the application code has been executed by the information terminal identified by the terminal code.

4. An information terminal, comprising:
- an input module configured to receive an input of data relating to the sales of a commodity;
- a processing module configured to process the data received by the input module; and
- a processor configured to, when the information terminal is attached to the docking station, read the application code and the takeover code from the work history table of the docking station, start the application program identified by the application code, and successively execute processing based on the application program by continuously using the data identified by the takeover code in a following processing,
- wherein the information terminal is configured to be freely attached to and detached from the docking station that includes a work history table in which at least an application code for identifying an application program executed by the portable information terminal and a takeover code for identifying data required to take over processing based on the application program are writable.

5. The information terminal according to claim 4,
- wherein the work history table further stores a terminal code for identifying the information terminal that has executed the processing based on the application program, and
- the processor is further configured to, when the information terminal is attached to the docking station, read the application code, the takeover code, and the terminal code from the work history table of the docking station, and shows on a display that the processing based on the application program identified by the application code has been executed by the information terminal identified by the terminal code.

6. A method for taking over processing by an information terminal, comprising:
- receiving an input of data relating to sales of a commodity;
- processing the data received; and
- when the information terminal is attached to a docking station, reading application code and takeover code from a work history table of the docking station, starting an application program identified by the application code, and successively executing processing based on the application program by continuously using data identified by the takeover code in a following processing,
- wherein the information terminal is configured to be freely attached to and detached from the docking station that includes a work history table in which at least an application code for identifying an application program executed by the portable information terminal and a takeover code for identifying data required to take over processing based on the application program are writable.

* * * * *